US012783403B2

(12) United States Patent
Kremer et al.

(10) Patent No.: US 12,783,403 B2
(45) Date of Patent: Nov. 3, 2026

(54) ON-THE-FLY MEMORY REMAPPING

(71) Applicant: MELLANOX TECHNOLOGIES, LTD., Yokneam (IL)

(72) Inventors: Gil Kremer, Kadima Tzoran (IL); Roee Moyal, Yoqneam Ilit (IL); Ariel Shahar, Jerusalem (IL)

(73) Assignee: Mellanox Technologies, Ltd., Yokneam (IL)

(*) Notice: Subject to any disclaimer, the term of this patent is extended or adjusted under 35 U.S.C. 154(b) by 67 days.

(21) Appl. No.: 18/674,973

(22) Filed: May 27, 2024

(65) Prior Publication Data

US 2025/0363044 A1 Nov. 27, 2025

(51) Int. Cl.
*G06F 12/02* (2006.01)

(52) U.S. Cl.
CPC .................................. *G06F 12/023* (2013.01)

(58) Field of Classification Search
None
See application file for complete search history.

(56) References Cited

U.S. PATENT DOCUMENTS

| | | | | |
|---|---|---|---|---|
| 8,412,987 B2 * | 4/2013 | Billing | G11C 16/349 | 714/710 |
| 10,997,080 B1 * | 5/2021 | Eliash | G06F 12/0871 | |
| 11,481,398 B1 * | 10/2022 | Behm | G06F 16/244 | |
| 2008/0098001 A1 * | 4/2008 | Gupta | G06F 16/258 | |
| 2011/0072199 A1 * | 3/2011 | Reiter | G06F 13/24 | 711/170 |
| 2011/0252180 A1 * | 10/2011 | Hendry | G06F 12/08 | 711/202 |
| 2023/0176734 A1 * | 6/2023 | Zhou | G06F 3/061 | 711/171 |
| 2024/0094908 A1 * | 3/2024 | Agrawal | G06F 3/0608 | |

* cited by examiner

*Primary Examiner* — Hosain T Alam
*Assistant Examiner* — Ryan Dare
(74) *Attorney, Agent, or Firm* — Meitar Patents LTD.; Daniel Kligler

(57) ABSTRACT

A computing system includes a memory and a table remap circuit. The table remap circuit is to modify a size of a table comprising table elements stored in the memory, while the table is available for access by one or more users, by (i) defining a first interim table and a second interim table, (ii) iteratively transferring table elements from the first interim table to the second interim table, (iii) in response to a request from a user to write a table element in the table, writing the table element in the first interim table or in the second interim table in accordance with a selection criterion, and (iv) remapping the table to the second interim table.

15 Claims, 7 Drawing Sheets

ON-THE-FLY MEMORY REMAPPING

FIELD OF THE INVENTION

The present invention relates generally to computer systems, and specifically to on-the-fly remapping of memory tables.

BACKGROUND

Computer systems may dynamically allocate and deallocate memory, including Last-In-Fist-Out (LIFO), First-In-First-Out (FIFO), Hash memories and others.

Background for dynamic memory allocation and deallocation techniques can be found, for example, in U.S. Patent Application Publication 2013/0088501, which discloses a method of allocating regions of memory including the steps of allocating a corresponding plurality of portions of memory for use by the process and marking regions of memory that are allocated with markers. A start-of-a-region is marked with one of the markers and an end of a region is marked with a further one of the markers, the further one of the markers having a later relative time indication and marking a next allocated region. In response to determining that a region of allocated memory bounded by two of the markers is no longer required by the process, deleting an older of the two markers; and in response to detecting deletion of an oldest one of the markers, deallocating the region of memory up to a new oldest pending marker.

Some LIFO background can be found in "Instability of LIFO queueing networks", Queueing Systems: Theory and Applications, Volume 99, Issue 1-2, October 2021, M. Bramson. The author asserts that under the last-in, first-out (LIFO) discipline, jobs arriving later at a class always receive priority of service over earlier arrivals at any class belonging to the same station. Subcritical LIFO queueing networks with Poisson external arrivals are known to be stable, but an open problem has been whether this is also the case when external arrivals are given by renewal processes. The author then shows that this weaker assumption is not sufficient for stability by constructing a family of examples where the number of jobs in the network increases to infinity over time, in contrast with the behavior of the other classical disciplines, such as processor sharing (PS), infinite server (IS) and first-in, first-out (FIFO), which are stable under general conditions on the renewals of external arrivals.

For some Hash-memory background, the reader is referred to U.S. Pat. No. 7,032,096, which discloses a memory management system and method that includes, in one embodiment, an index location in a Hash table that represents metadata, and a file memory address saved at the index location so that the Hash table is searchable by a processor by entering the metadata into a Hash function to transform the metadata into the index location where the memory address is stored.

SUMMARY

An embodiment that is described herein provides a computing system including a memory and a table remap circuit. The table remap circuit is to modify a size of a table comprising table elements stored in the memory, while the table is available for access by one or more users, by (i) defining a first interim table and a second interim table, (ii) iteratively transferring table elements from the first interim table to the second interim table, (iii) in response to a request from a user to write a table element in the table, writing the table element in the first interim table or in the second interim table in accordance with a selection criterion, and (iv) remapping the table to the second interim table.

In some embodiments, the first interim table is part of the table. In some embodiments, the second interim table is part of the table. In example embodiments, the table remap circuit is to manage each of (i) the table (ii) the first interim table, and (iii) the second interim table, as a respective Last-In First-Out (LIFO) data structure.

In a disclosed embodiment, the table remap circuit is to respond to a request from the user to read a table element that corresponds to a given match key by: if the second interim table contains a table element corresponding to the given match key, providing the user with the table element from the second interim table; and, if no table element from the second interim table corresponds to the given match key, providing the user with a table element from the first interim table that corresponds to the match key.

In an embodiment, the table remap circuit includes an iterator circuit for iteratively scanning tables in the memory, and the table remap circuit is to transfer the table elements from the first interim table to the second interim table by scanning the first interim table using the iterator circuit. In some embodiments, the table includes a hash table. In some embodiments, the table elements include pointers to allocated memory segments.

There is additionally provided, in accordance with an embodiment that is described herein, a computing system including a memory and a table remap circuit. The table remap circuit is to modify a size of a table comprising table elements stored in the memory, while the table is available for access by one or more users, by: dividing the table into (i) a first part designated to store table elements that are to be removed from the table and (ii) a second part designated to store table elements that are to be retained in the table; iteratively transferring the table elements from the first part to the second part; and remapping the table to the second part of the table.

There is further provided, in accordance with an embodiment that is described herein, a computing method including modifying a size of a table including table elements stored in a memory, while the table is available for access by one or more users. The size of the table is modified by (i) defining a first interim table and a second interim table, (ii) iteratively transferring table elements from the first interim table to the second interim table, (iii) in response to a request from a user to write a table element in the table, writing the table element in the first interim table or in the second interim table in accordance with a selection criterion, and (iv) remapping the table to the second interim table.

There is also provided, in accordance with an embodiment that is described herein, a method for resizing a Last-In First-Out (LIFO) table including table elements stored in a memory. The method includes splitting the LIFO table into a first table and a second table. The second table is to contain the resized LIFO table following the resizing. A "Do not Return to LIFO" (DTRL) threshold is defined. While the LIFO table is available for access by one or more users, an iterative process is performed, including, in each iteration: (i) scanning the first table until identifying a first table element that is greater than or equal to the DTRL threshold, (ii) scanning the second table until identifying a second table element smaller than the DTRL threshold, and (iii) swapping the first table element and the second table element.

There is further provided, in accordance with an embodiment that is described herein, a method for resizing a hash table including table elements stored in a memory. The method includes defining a first hash table and a second hash table. The second hash table is to contain the resized hash table following the resizing. User requests to access the hash table are responded to, by: (i) responding to a request to write a table element by writing the table element to the second hash table, and (ii) responding to a request to read a table element, or to remove a table element, by reading or removing the table element from the first or second hash table, depending on a location of the table element. An iterative process, which gradually moves table elements from the first hash table to the second hash table, is performed concurrently with responding to the user requests.

The present invention will be more fully understood from the following detailed description of the embodiments thereof, taken together with the drawings in which:

DETAILED DESCRIPTION OF EMBODIMENTS

Overview

Figures 1A, 1B, 1C:
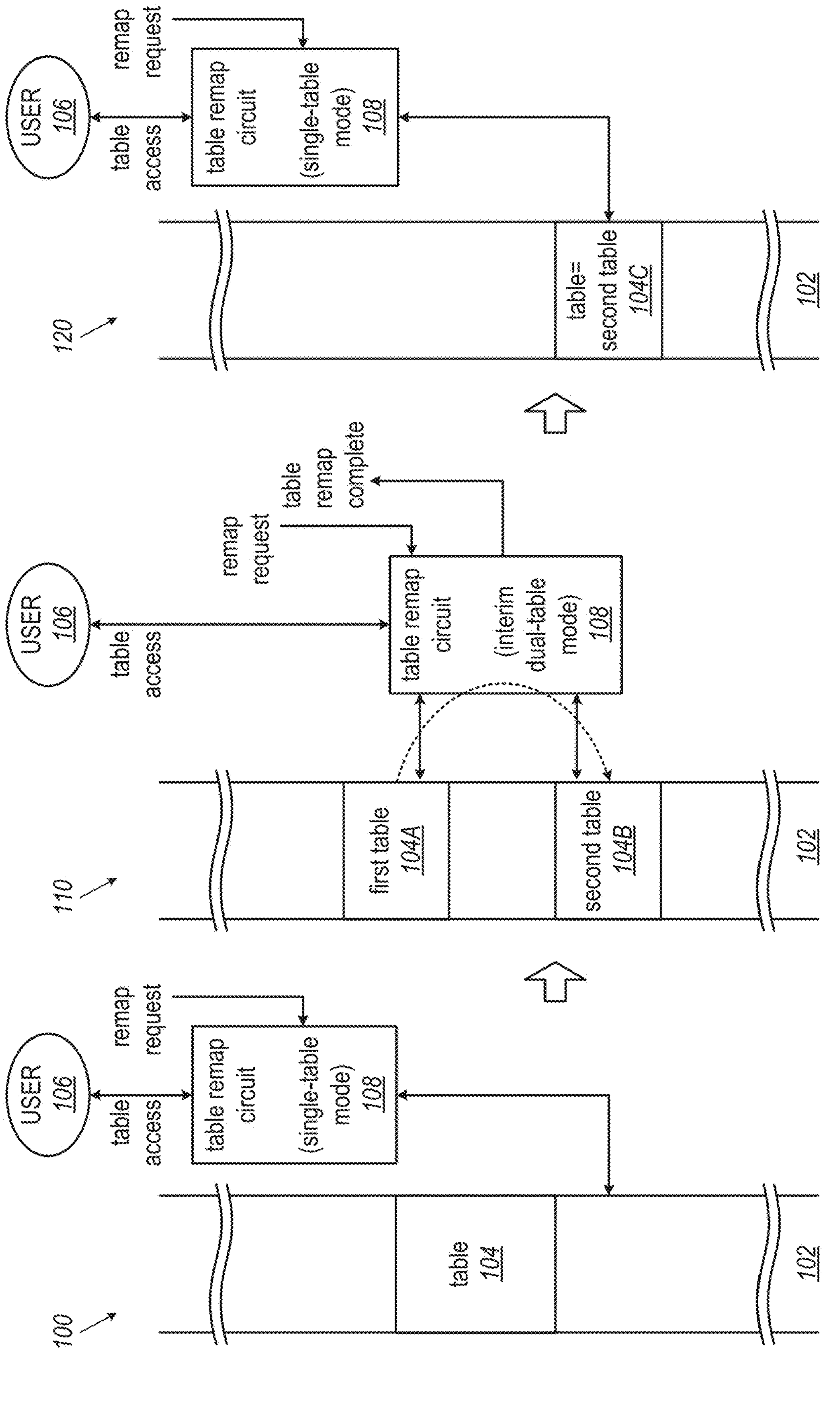
FIG. 1A is a block diagram that schematically illustrates the accessing of a memory table in a computing system at an initial single-table phase, in accordance with an embodiment of the present invention.
FIG. 1B is a block diagram that schematically illustrates the accessing of a memory table in a computing system at an interim dual-table phase, in accordance with an embodiment of the present invention.
FIG. 1C is a block diagram that schematically illustrates the accessing of a memory table in a computing system 120 following a table remap, in accordance with an embodiment of the present invention.

Computing systems often comprise shared memory, which can be allocated to various software processes, e.g., user programs. Due to varying requirements of the software processes, for example, the operating system may occasionally change the size of memory allocated to some or all the processes. Such size modifications should be performed on-the-fly, i.e., while the table is available to access, and should not stall the execution.

Embodiments of the present invention that are described herein provide methods and systems to seamlessly modify the size of memory tables that are allocated to software processes, with little or no effect on process execution. The software processes are also referred to herein as "user programs" "users" or "clients", and all these terms are used interchangeably.

In some embodiments, the computing system comprises a Table Remap Circuit (TRC); in an embodiment, to reduce the size of a Last-In-First-Out memory table according to the contents of the LIFO entries. The TRC first divides the LIFO table to a first interim table and a second interim table; the TRC then gradually and iteratively transfers entries from the second interim table to the first interim table, according to the contents of the entries. While transferring entries, the TRC also directs LIFO accesses to the first or to the second LIFO tables, again, according to the contents of the accessed LIFO entries. When all data has been transferred to the second table, the TRC signals to the operating system that the two-table interim phase is complete.

In another embodiment, the computing system changes the size of a Hash memory table by changing an ownership bit and indicating that a second ("new") Hash table should turn active, in lieu of the previous Hash table. The TRC gradually and iteratively moves entries from the previous table to the new table. While transferring entries, the TRC directs Hash accesses (read, write, or remove) to the new and/or to the previous Hash tables, according to an algorithm that is described below.

Thus, in embodiments to be described below, LIFO and HASH table sizes can be modified on-the-fly, while the table is available for access by one or more users, with little or no performance degradation. The disclosed techniques are not limited to LIFO tables and hash tables, and can be used in a similar manner to resize other types of memory tables.

System Description

An operating system or other supervisory software (sometimes referred to as Firmware, or FW) may change the size of memory tables allocated to user programs (sometimes referred to as "clients" or "users") dynamically. In embodiments, such size modification may take place on-the-fly, with minimum or no impact on the performance. In the present context, the term "on-the-fly" means that the memory table in question remains available for access throughout the size modification process. Some minor performance degradation (e.g., slightly higher access latency) is permissible, as long as service is not disrupted. The computing system is initially at a Single-Table phase; then, to modify the table size, the computing system enters an Interim Dual-Table phase in which two tables are used; lastly, after merging the two tables to one, the computing system returns to the single table phase.

FIG. 1A is a block diagram that schematically illustrates the accessing of a memory table in a computing system 100 at an initial single-table phase, in accordance with an embodiment of the present invention. The computing system comprises a memory 102, which may be divided into functional segments, including a Table 104. In embodiments, table 104 may be a Last-In-First-Out (LIFO) memory, a Hash memory, or any other suitable memory table.

A User Program 106 runs on the computing system. The User Program accesses Table 104, through a Table Remap Circuit (TRC) 108, which may translate table addresses that the User sends to addresses in memory 102 (e.g., by adding a base to the address and/or multiplying the table address to the width of the table elements). The TRC may then retrieve (for a read cycle) data from the table and send the data to the User, or (for a write cycle), write data that the User sends to the specified address in the table (the user may also send additional access types, Such as remove entry).

According to the example embodiment illustrated in FIG. 1A, TRC 108 is at the Single-Table mode, in which all table accesses requested by the User are directed to a single table (table 104). TRC 108, however, comprises a Remap Request input, and the computing system (e.g., an operating system running on the computing system) may assert the Remap Request input, to signal that the TRC should switch to an Interim-Dual-Table mode, and remap table 104 (for example, to a smaller size table).

FIG. 1B is a block diagram that schematically illustrates the accessing of a memory table in a computing system 110 at an interim dual-table phase, in accordance with an embodiment of the present invention. Table 104 of FIG. 1A is now split into two tables—a First Table 104A and a Second Table 104B (the first and second tables are also referred to hereinbelow as the First Interim Table and the Second Interim Table).

In some embodiments, First Table 104A and Second Table 104B are two parts of Table 104 (FIG. 1A); in other embodiments, each of First Table 104A and/or Second Table 104B may be located elsewhere in memory 102; in an embodiment, First Table 104A comprises Table 104, whereas Second Table 104B is prepared by the operating system.

The Dual-Table phase is a transitory phase between two single-table phases. During the Dual-Table phase, the TRC gradually and iteratively moves table data to the Second table (indicated by a dashed line in FIG. 1B) and, concurrently, routes User accesses to the table, according to a selection-criterion (examples of selection criteria will be described below, with reference to FIG. 5 and FIG. 6), to either the first table or the second table (or, sometimes, to both tables), allowing continuous user service.

When there are no more entries in the First Table that need to be moved to the Second Table, the TRC typically sends a table-remap-complete indication to the operating system, and then reenters the Single-Table mode.

FIG. 1C is a block diagram that schematically illustrates the accessing of a memory table in a computing system 120 following a table remap, in accordance with an embodiment of the present invention. TRC 108 is now at the Single-Table mode, routing all User's table access to a new table 104C, comprising Second Table 104B (FIG. 1A).

Thus, according to the embodiment illustrated in FIGS. 1A, 1B and 1C, a TRC can seamlessly remap memory tables, without interrupting service to the users.

Figure 2:
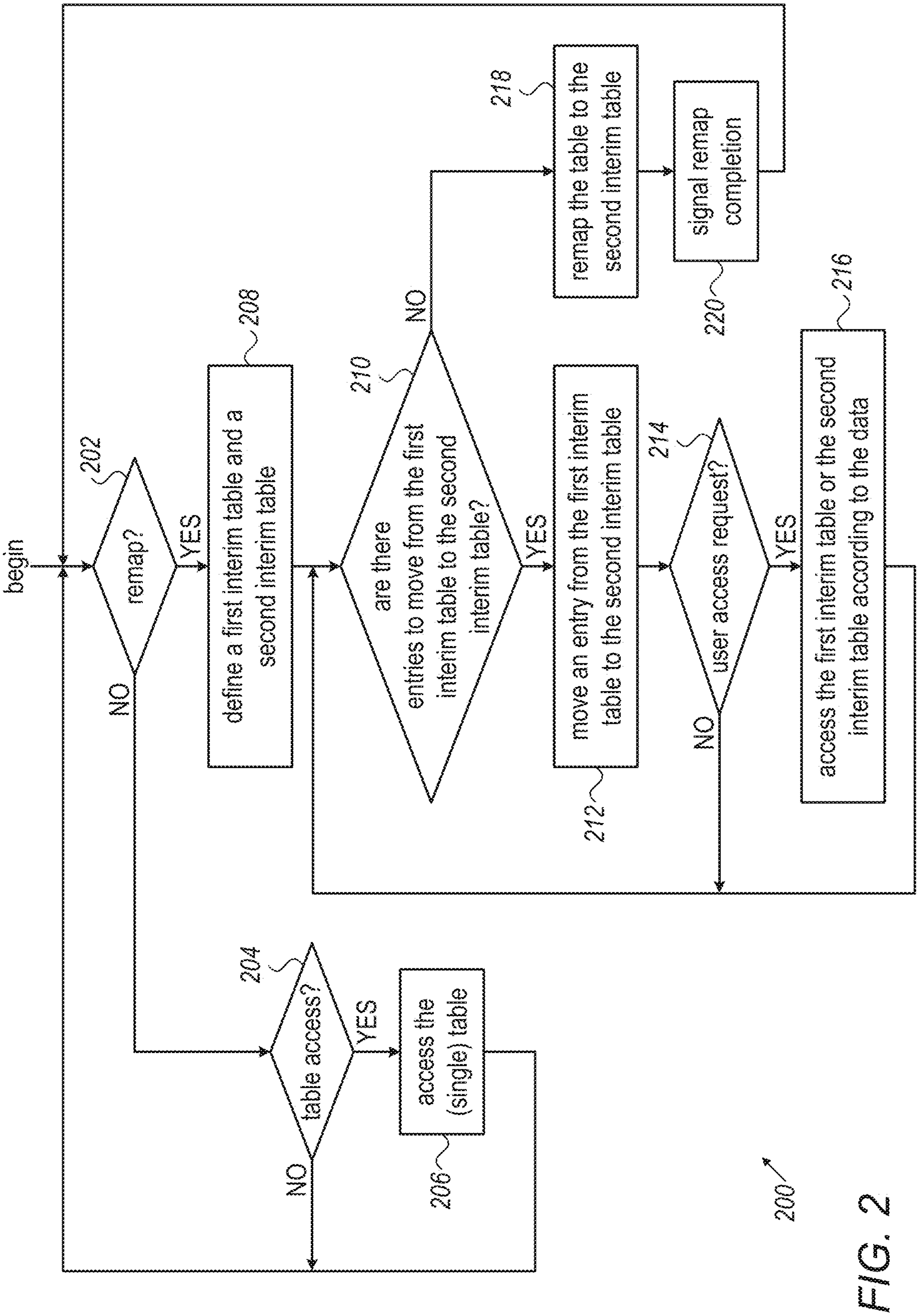
FIG. 2 is a flowchart that schematically illustrates a method for on-the-fly memory mapping, in accordance with an embodiment of the present invention.

FIG. 2 is a flowchart 200 that schematically illustrates a method for on-the-fly memory mapping, in accordance with an embodiment of the present invention. The flowchart is executed by TRC 108 (FIGS. 1A, 1B and 1C). The flowchart starts at a Check-Remap operation 202, wherein the TRC checks if table remap is requested (e.g., by the operating system). If Table Remap is not requested, the flowchart enters a Check-Access-Request operation 204 to check if a user program requests to access the table; if no table access is requested, the flowchart reenters operation 202 to, again, check for a remap request. If, in operation 204 a table access is requested, the flowchart enters an Access-Single-Table operation 206 wherein the TRC directs the access to the single table; after operation 206 the flowchart returns to operation 202.

If, in operation 202, a remap request is found, the flowchart enters a Define Interim Tables operation 208, and defines a First Interim Table and a Second Interim Table. In some embodiments, the first and/or the second interim table comprise portions of the table (prior to the remap request); in other embodiments, the first and/or second tables may be provided by the operating system.

The TRC will now start a process of merging the data from the two interim tables into the second interim table, which will be the single table to be used when the remap is completed. At a Check-Entries-to-be-Moved operation 210, the TRC checks if there is any data in the first interim table that should be moved to the second interim table. If so, the flowchart enters a Move-Entry operation 212, to move an entry from the first interim table to the second interim table.

After operation 212, the flowchart enters a Check-Access Request operation 214; if a user table access request is found, the TRC will, at an Access Interim Table operation 216, direct the access request to the first or to the second interim table, according to the data value and a selection criterion. After operation 216 and, if there is no table access request in operation 214, the flowchart reenters operation 210, to check for further data items to be moved to the second interim table.

When there are no more data items to be moved from the first to the second interim table, the flowchart will, after operation 210, enter a Remap Table operation 218, and remap the table to the second interim table; then, at a Signal Remap Completion operation 220, the TRC will signal to the operating system that table remap is complete. After operation 220 the flowchart will reenter operation 202, to, again, wait for a Remap request.

The configuration of flowchart 200, illustrated in FIG. 2 and described above, is cited by way of example. Other suitable flowcharts may be used in alternative embodiments. For example, in some embodiments, the order of the operations may be different; in embodiments, some or all the operations described above may be done concurrently.

Last-In-First-Out (LIFO) Table Size Modification

In some embodiments, the memory table is a LIFO memory, in which the least recently written entry is the first entry to be read. In embodiments, A LIFO pointer is defined for each LIFO; writing to the LIFO is done by (i) writing the data at the location pointed to by the LIFO pointer, and (ii) incrementing the LIFO pointer; reading data from the LIFO is done by (i) decrementing the LIFO pointer, and (ii) reading the data from the location pointed to by the LIFO pointer. (In some embodiments writing is done by incrementing the pointer prior to the write operation and reading is done by decrementing the pointer after the read operation.) We will arbitrarily refer to incrementing the LIFO pointer as moving the pointer up, and to decrementing the LIFO pointer as moving the pointer down.

The process of adding data to a LIFO described above, including the incrementing of the pointer, is sometimes called "pushing data into a LIFO"; conversely, the process of getting data from a LIFO, including the decrementing of the pointer, is sometimes called "pulling data from a LIFO".

In an example embodiment, a memory allocation LIFO is prefilled by the operating system with pointers to available pages in memory. When a user needs storage area, the user accesses the LIFO table to get a pointer to an available page; when the user no longer needs the storage area, the user accesses the LIFO to return the pointer. The pages in memory may be ordered initially (e.g., the operating system may order the pointers in the LIFO, from lowest to highest), however, after several read and write cycles, the pages in LIFO may be unordered.

At a given point in time, the operating system may want to reduce the table size, saving not only LIFO size but also the amount of allocated memory. For example, the LIFO may initially include pointers to in a 4G-byte memory space but, at one point, the operating system may want to reclaim all pages in the top 2G-bytes. In embodiments, this is done by issuing a remap request to the TRC, along with a Do Not Return to LIFO (DRTL) parameter that indicates a target threshold for LIFO entries that should be retained in the LIFO. In the example above, DRTL=2G, and only LIFO entries for pages in the lower 2G will be retained in the FIFO.

Figure 3:
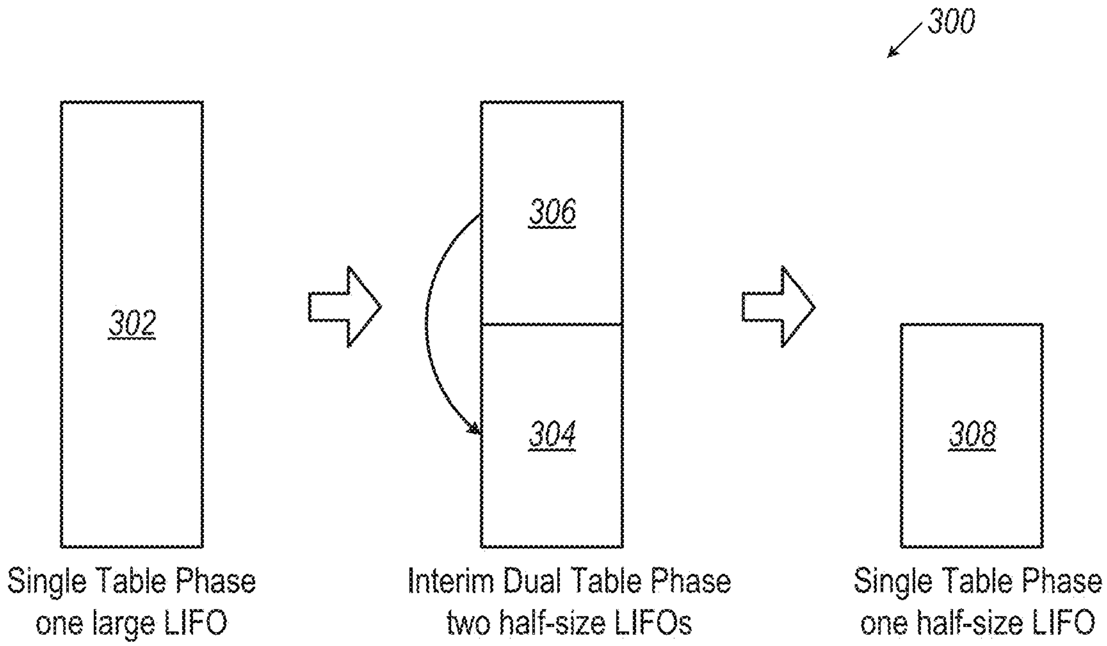
FIG. 3 is a diagram that schematically illustrates on-the-fly size-reduction of a Last-In-First-Out (LIFO) memory, in accordance with an embodiment of the present invention.

FIG. 3 is a diagram that schematically illustrates on-the-fly size-reduction of a LIFO memory, in accordance with an embodiment of the present invention. According to the example embodiment illustrated in FIG. 3, the LIFO size is halved. Initially the computing system is in the single table phase, and the LIFO comprises a full-size table 302. Then, at the Interim Dual-Table phase, the LIFO is cut to two parts—a bottom LIFO 304 and a top LIFO 306. While in this mode, relevant entries (according to a comparison with the DRTL parameter) from the top LIFO are moved to the bottom LIFO, transparently to users who may access the LIFO. Lastly, after all relevant LIFO entries are in the bottom LIFO, the LIFO comprises a half-size LIFO 308, and the computing system, again, enters the Single-LIFO phase.

We will now describe the Interim Dual-Table Phase illustrated in FIG. 3, in detail.

Figure 4:
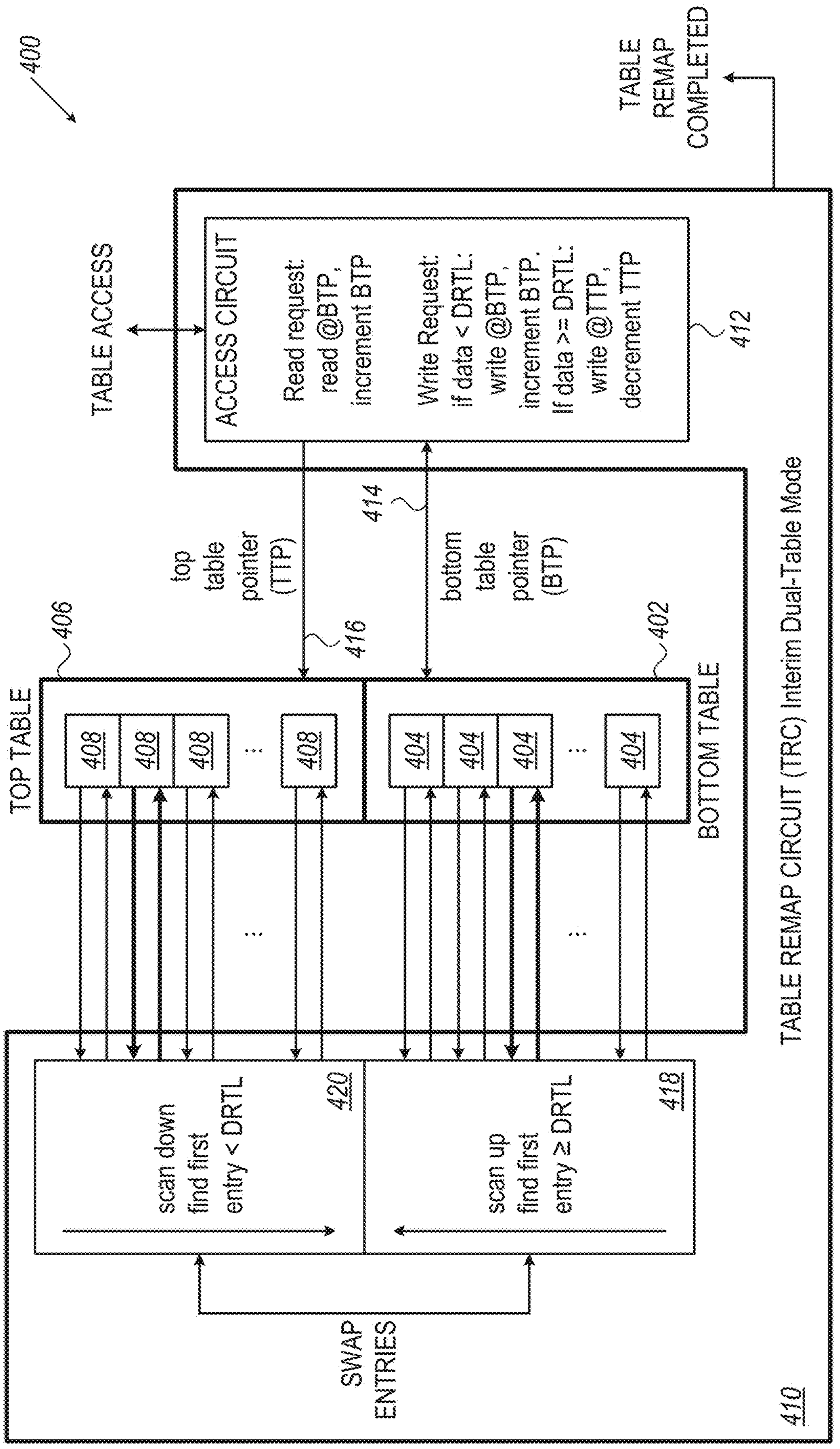
FIG. 4 is a block diagram that schematically illustrates a Computing System with a LIFO in the Interim Dual-Table phase, in accordance with an embodiment of the present invention.

FIG. 4 is a block diagram that schematically illustrates a Computing System 400 with a LIFO in the Interim Dual-Table phase, in accordance with an embodiment of the present invention. The LIFO, at this phase, comprises two tables: a Bottom Table 402, comprising entries 404, and a Top Table 406, comprising entries 408. A Table Remap Circuit (TRC) 410 controls the LIFO tables. At the Single-Table phase prior to entering the Interim Dual-Table phase, the single LIFO table comprised the aggregation of Bottom Table 402 and Top Table 406; at the Single-Table phase following the Interim Dual-Table phase, the LIFO will comprise Bottom-Table 402 only.

TRC 410 is at the Interim-Dual-Table mode, during which the TRC merges the two tables into a single new table, transparently to the user.

The TRC interfaces with user programs through an Access Circuit 412, using a pair of LIFO pointers—a Bottom-Table-Pointer (BTP) 414, and a Top Table Pointer (TTP) 416. The TTP is initially set to the bottom of the Top Table; the BLP remains unchanged from its position at the preceding Single-Table Mode, pointing to the next entry to be written (we assume that at least half or the LIFO is empty when the operating system sends the size-reduction request; in embodiments, if this is not the case, the TRC will delay the mode change accordingly).

The operation of Access Circuit 412 in response to a LIFO access request is as follows:

Read Access Request:

(i) Decrement BTP (ii) Return the data stored at location BTP (in the Bottom Table) to the user Write Access Request:

(i) Compare the data to be written to the DRTL parameter.

(ii) If data <DTRL:

a. Store the data at location BTP (in the Bottom Table).

b. Increment BTP.

(iii) Else (if data ≥DTRL):

a. Store the data at location TTP (in the Top Table).

b. Increment TTP.

In other words: data is always pulled from the Bottom Table; written data is pushed onto the Bottom Table unless the data value is above the preset limit, in which case it is pushed onto the Top Table.

The process described above will route LIFO entries to the bottom table or the top table, according to a selection criterion based on a comparison of the data to the DRTL parameter. the data values. This is needed in order to switch to the Single-Table mode wherein the entire LIFO is contained in the Bottom Table. However, the process only sorts data that the user writes into the LIFO. Table entries that are not written in this phase may remain unsorted. In particular, the Bottom Table may include data entries that are bigger than or equal to the DRTL parameter, and/or the Top Table may include data entries that are smaller than the DRTL. For a complete sort, TRC 410 is configured to iteratively scan the tables and exchange pairs of entries, until the Bottom Table includes only entries that are smaller than DTRL, and the Top Table includes only entries that are bigger than or equal to DTRL.

This scan/exchange is done by two sorting circuits: a Sort-Up circuit 418 that scans the Bottom Table, from bottom to top, and looks for entries that are bigger than or equal to DTRL, and a Sort-Down circuit 420 that scans the Top Table, from top to bottom, looking for entries that are smaller than DTRL. When both scan circuits find an entry, the TRC swaps the two entries; that is, an entry, smaller than DRTL, in the Top Table is swapped with an entry in the Bottom Table that is bigger than or equal to DRTL.

When the scan ends, all entries smaller than DRTL are in the Bottom Table, and the Computing System may enter the Single Table phase; the LIFO comprises the Bottom Table only (the Top Table may be scrapped, or else, reused by the operating system).

Thus, when going through the Interim Dual-Table phase, the TRC manages the two halves of the LIFO so that only one half will be needed, while providing continuous support to user access requests.

The configurations of TRC 410 and memory tables 402, 406, illustrated in FIG. 4 and described above, are cited by way of example. Other configurations may be used in alternative embodiments. For example, in some embodiments, the Bottom Table is not equal in size to the Top Table. In embodiments, Pointer increment precedes the write operation in a LIFO write operation and data-read precedes pointer decrement in a LIFO read operation. The choice of Increment for Push and Decrement for Pop is arbitrary and, in embodiments, may be switched.

Figure 5:
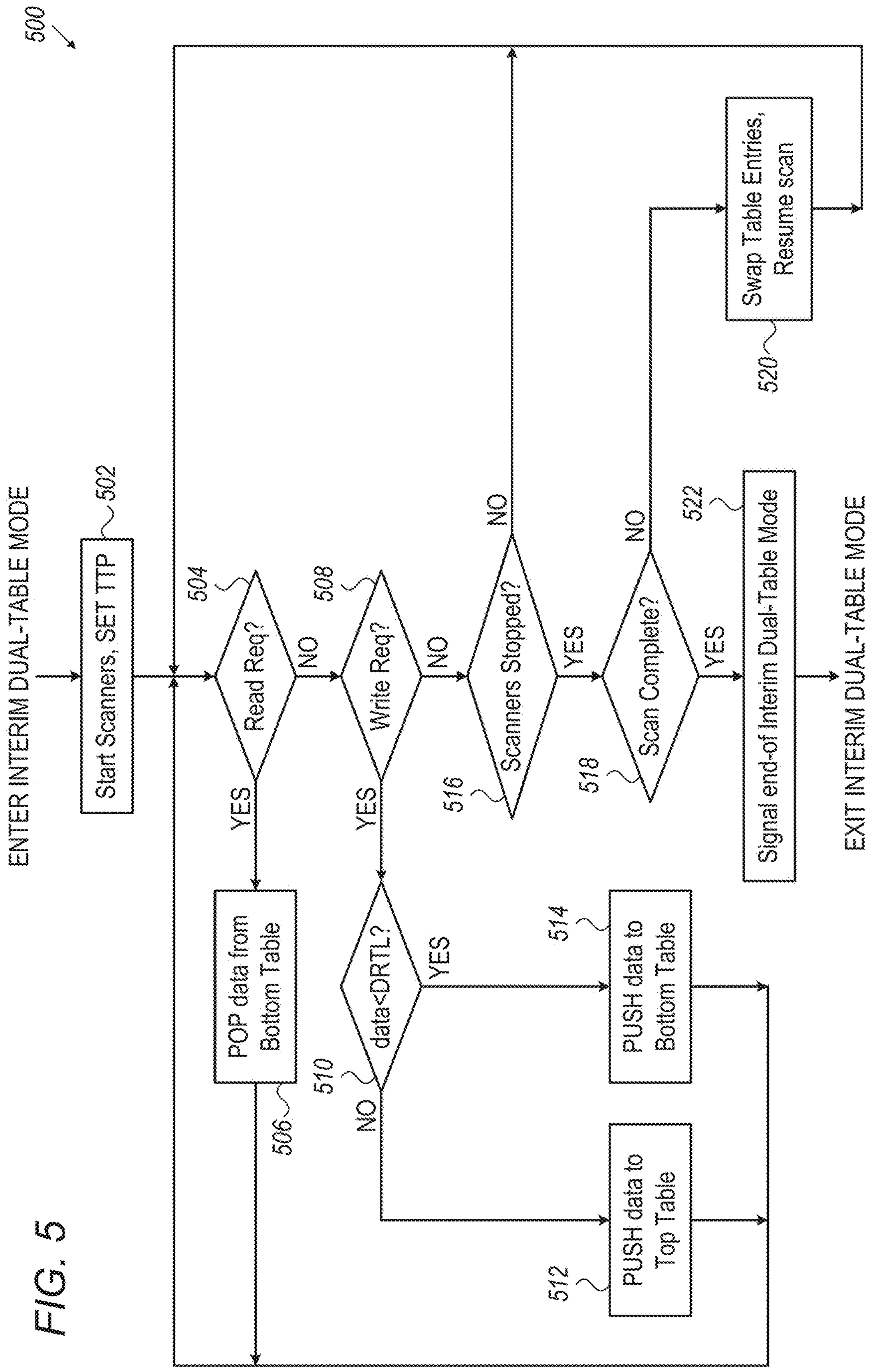
FIG. 5 is a flowchart that schematically illustrates the operation of a Table Remap Circuit (TRC) when the TRC controls a LIFO memory, in accordance with an embodiment of the present invention.

FIG. 5 is a flowchart 500 that schematically illustrates the operation of TRC 410 (FIG. 4) when the TRC controls a LIFO memory, in accordance with an embodiment of the present invention. The computing system initiated the flowchart when entering the Interim-Dual-Table mode. The flowchart starts at a Starts-Scanners operation 502, wherein the TRC starts the scan circuits 418 and 420 and sets TTP 416 to point at the start of Top Table 406 (FIG. 4). Scan circuit 418 will start scanning Bottom Table 402 and stop when it finds an entry that is smaller than the DRTL parameter; Scan circuit 420 will start scanning Top Table 406 and stop when it finds an entry that is bigger than or equal to the DRTL parameter.

If, at a subsequent Check-Read-Request operation 504, a Read is requested by the user, the TRC will, at a POP-from-Bottom operation 506, pop data from the Bottom Table 402, and then reenter operation 504 to recheck for a Read Request.

If, in operation 504, there is no Read request the TRC will, at a Check-Write-Request operation 508, check if a Write is requested by the user. If so, the flowchart will enter Compare-Data-to-DRTL operation 510, wherein the TRC will compare the write data to the DRTL parameter. If the data is bigger than or equal to DRTL, the TRC will, at a Push-Data-to-Top operation 512, push the data onto the Top Table 406; if the data is less than the DRTL parameter, the TRC will, at a Push-Data-to-Bottom operation 514, push the data onto the Bottom Table 402.

If, in operation 508, there is no Write request (and, since Read request was not found in the preceding operation 504), there is no request from the user, the TRC will exchange data between the top and the bottom tables; at a Check-Scanners-Stopped operation 516, the TRC will check if the scan circuits 418 and 420 have both stopped (meaning that scan circuit 428 found the next entry in the BOTTOM table that includes a data item larger than or equal to the DRTL parameter, and, scan circuit 420 found the next entry in the TOP table that includes a data item that is smaller than the DRTL parameter). If so, the TRC will, at a Check-Scan-Complete operation 518, check if both scan circuits have reached the ends of the corresponding tables; if so, the TRC will, at an Signal-Exit-From-Interim-Dual-Table-Mode operation 522, signal to the operating system that the single-table mode can resume, and exit the flowchart.

If, in operation 518, the scan is not complete, the TRC will exchange the entries in the two table according to the locations in which the two scan circuits have stopped, resume the scan circuits scanning, to find the next pair of entries, and reenter operation 504, to, again, check for a read request.

Thus, according to the flowchart illustrated in FIG. 5 and described above, the TRC will move entries smaller than DRTL from the top table to the bottom table, while directing LIFO access requests according to the DRTL parameter, maintaining uninterrupted user service.

The configuration of flowchart 500 illustrated in FIG. 5 and described hereinabove is cited by way of example. Other configurations may be used in alternative embodiments. For example, in some embodiments, some or all the operations are executed in parallel. In another example embodiment, the scanners may find two or more pairs of entries, operation 516 will check if the scanners have found at least one pair of entries to be swapped, and operation 520 will comprise exchanging all found pairs.

Hash Table Size Modification

In some embodiments, the table comprises a Hash table, set by the operating system and accessed by users. The operating system may define two Hash tables and indicate which of the two tables is currently active (for example, by setting a corresponding Owner bit). In an embodiment, each Hash table has a corresponding Context store, which may include the Owner bit (defined above), a Table Size parameter, a Valid-Count register, indicating how many valid entries are in the table, a pointer to the first location of the table in memory and, sometimes, other parameters. We will refer below to the Hash table for which the Owner bit is set as the Active Hash table and to the other Hash table as the Inactive Hash Table.

The operating system may change (e.g., reduce) the size of the Hash table by setting the Table Size parameter of the inactive Hash table to a lower number, and then switch the Owner bit to make the inactive Hash table active.

When the operating system switches the Owner bit, the table that turns active is typically empty (e.g., the Valid-Count register stores zero).

We define a Hash Read operation as a search for a given tag, and, if the tag is found and a corresponding Valid bit is set, returning the stored data to the user. We define a Hash Remove-Entry operation as a search for a given tag in the table and clearing the corresponding Valid bit. We define a Hash-Write-Entry operation as adding the data to the Hash table and setting the corresponding Valid bit.

Figure 6:
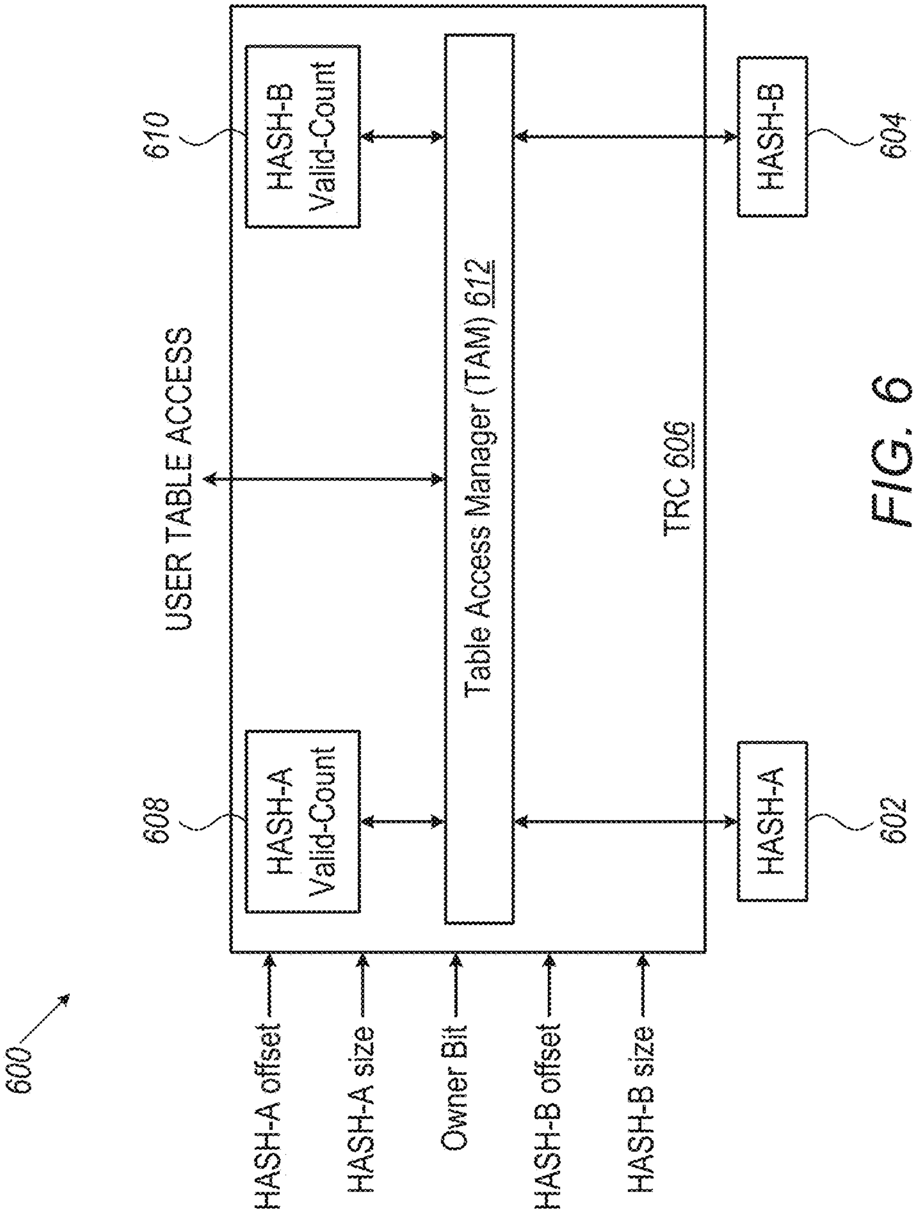
FIG. 6 is a block diagram that schematically illustrates a Computing System with Hash tables, in accordance with an embodiment of the present invention.

FIG. 6 is a block diagram that schematically illustrates a Computing System 600 with Hash tables, in accordance with an embodiment of the present invention. The operating system defines two Hash tables—a Hash Table A 602 and a Hash Table B 604, and indicates, for each Hash table, the offset of the first table address (e.g., versus a preset address in memory) and the size of the table.

Computing System 600 further comprises a Table Remap Circuit (TRC) 606, which is configured to facilitate HASH table remap, transparently to any user who may access the Hash table. TRC 606 comprises a Hash-A valid-count register 608 and a Hash-B valid-count register 610, configured to indicate the number of valid entries in Hash-A Table 602 and Hash-B Table 604, respectively. A Table Access Manager (TAM) 612 controls access to the Hash tables. If the number of valid entries in the inactive Hash table (indicated by Hash-A Valid count register 608 or Hash-B Valid count register 610) is zero, TRC 606 is in the Single-Table mode, and Hash accesses will be directed to the active Hash table.

If the number of valid entries in the inactive Hash table is greater than zero, the TRC is in the Interim Dual-Table mode. TAM 612 will direct user accesses to the active and/or the inactive Hash table according to a selection criterion based on the location of the requested data and, in parallel, move entries from the inactive to the active HASH table. the TAM will update Hash-A Valid Count register 608 and Hash-B Valid Count register 610. When the number of entries in the invalid Hash reaches zero, the TRC will indicate to the operating system that remapping is completed; the operating system will, responsively, switch the owner bit.

Figure 7:
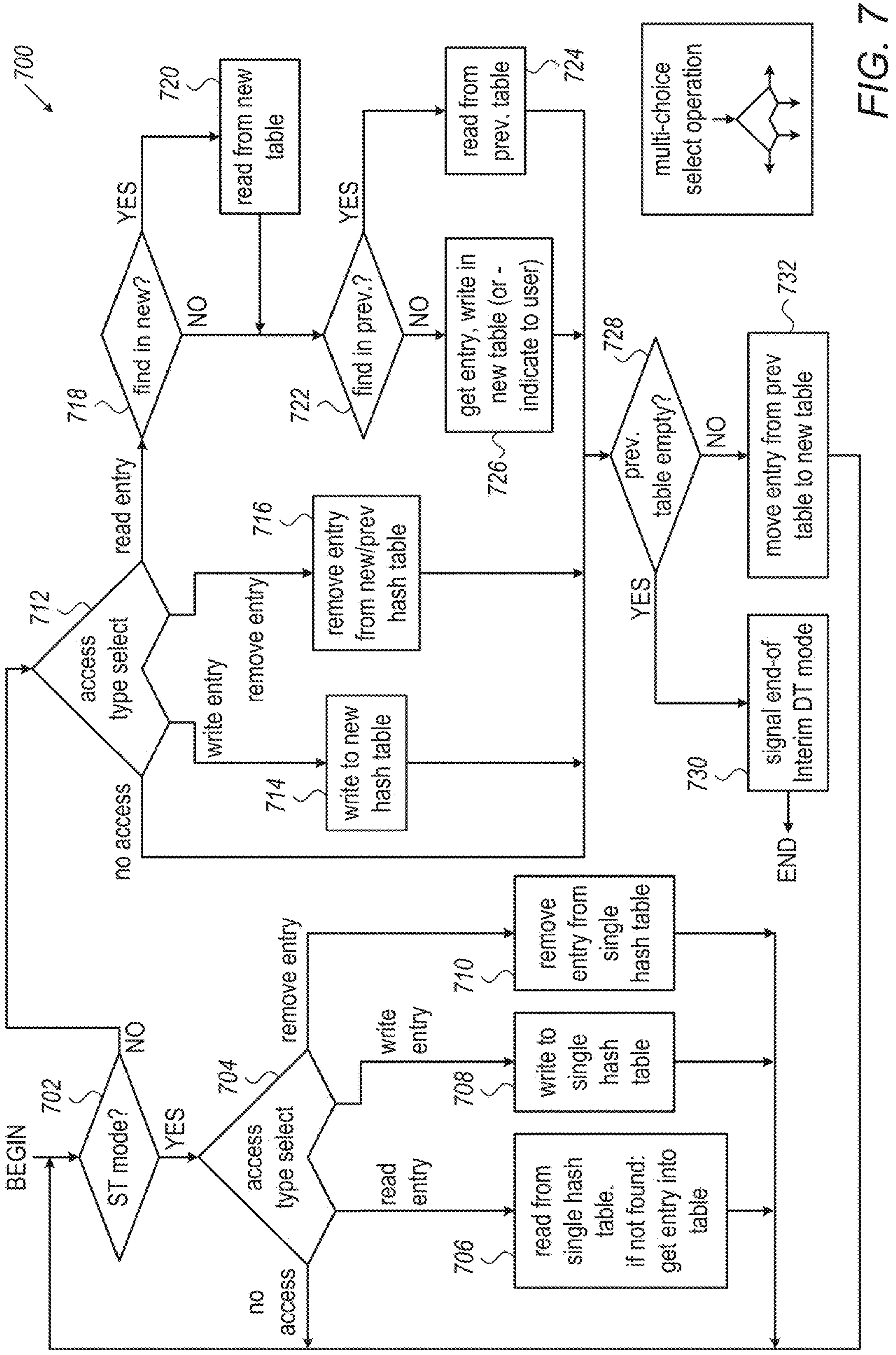
FIG. 7 is a flowchart that schematically illustrates the operation of a Table Access Manager (TAM) within the TRC of FIG. 6, in accordance with an embodiment of the present invention.

FIG. 7 is a flowchart 700 that schematically illustrates the operation of the TAM (612) within TRC 606 (FIG. 6), in accordance with an embodiment of the present invention. Flowchart 700 comprises a Hash-management flow; in embodiments, TAM 612 may comprise a controller that runs firmware to execute flowchart 700; in other embodiments TAM 612 may comprise a finite state machine (FSM) to execute flowchart 700, and in yet other embodiments other suitable circuits may be used.

In the description below, we will, when the TRC is in the Interim-Dual-Table mode, refer to the Hash table that corresponds to the set owner bit as the New Hash Table (or New Table), and to the other table as the Previous Hash Table (or Previous Table).

The flowchart starts at a Check-Single-Table mode operation 702, wherein the TAM checks if the current mode of operation is Single-Table (ST) mode (in embodiments, the mode is ST if the Hash-valid-count register corresponding to the invalid Hash table is zero). If so, the flowchart enters a Select-Access-Type operation 704, and then branches according to an access that the firmware or the user may request. If, in operation 704, the access type is Read Entry, the TAM, in a Read-from-Single-Table operation 706 will match the entry against the single table (if the entry is not found—the TRC will get a new entry (from a cache-miss handling circuit, which is not shown here) and store the entry in the table).

If, in operation 704, the access type is write-entry, the TAM, in a Write-to-Hash operation 708, will write the entry in the single table and increment the Hash-valid-count register that corresponds to the current table; if the access type is Remove-Entry the TAM will, in a Remove-From-Hash operation 710, remove the entry from the single table and decrement the Hash-valid-count register that corresponds to the current table.

After operations 706, 708, 710 and, (if no access is found), after operation 704, the flowchart reenters operation 702, to restart the table-access management flow.

If, in operation 702, the operating mode is not the Single-Table mode (i.e., the mode is Interim Dual-Table mode), the flowchart enters a Select-Access-Type operation 712, and then branches according to an access that the firmware or the user may request. If, in operation 712, the access type is Write Entry, the TAM, at a Write-to-New-Table operation 714, write the entry in the new Hash table and increment the corresponding valid-count register; If, the access type is Remove Entry, the TAM, at a Remove Entry operation 716, searches and deletes the entry in the new and in the previous tables, and decrement the corresponding valid-count registers.

If, in operation 712, the Access Type is Read, the flowchart enters a Find-In-New operation 718, and searches for the entry in the new Hash table. If the entry is found, the TAM will, in a Read-From-New-Table operation 720, read from the new Hash table; if not, the flowchart will enter a Find-In-Previous operation 722 and search the entry in the previous Hash table. If the entry is found, the TAM will, in a Read-From-Previous-Table operation 724, read from the previous Hash table.

If the entry is not found in either the previous table or the new table, the TAM will enter a Get-Entry-to-New operation 726, get the entry (from a cache-miss handling circuit, which is not shown here) and store the entry in the New table (in some embodiments, the TAM may have a mode-of-operation wherein, in operation 726, rather than getting an entry, the TAM will indicate to the user that an entry is missing).

The flowchart enters Check-Previous-Table-Empty operation 728 in the following cases (i) after operation 712, if no access is detected; and, (ii) after each of operations 714, 716 724 and 726. If, in operation 728, the previous table is empty (e.g., the value of the corresponding valid-count register is zero), the TRC will, in a Signal-End-of-DT-Mode operation 730, signal to the operating system that the Interim Dual-Table mode can be terminated, as all data is in the new table.

If, in operation 728, the previous table is not empty, the TAM, at a Move-Entry operation 732 will move a valid entry from the previous Hash table to the new Hash Table, decrement the valid-count register that corresponds to the previous Hash table and increment the valid-count register that corresponds to the new Hash table. After each of operations 730 and 732, the flowchart reenters operation 702, to restart the table-access management flow.

Thus, according to the example embodiment illustrated in FIG. 7, The TRC detects an interim-dual-table mode, directs all Hash accesses to the new or the previous Hash table and iteratively moves all entries to the new table, transparently to the user. When done, the TRC signals to the operating system that the Single Table mode can be resumed (note that, in some embodiments, operation 732 moves addresses only, and, if the TAM goes through operation 732, the user will need to copy the data from the inactive table to the active table after flowchart 700 is completed).

The configuration of Flowchart 700, illustrated in FIG. 7 and described hereinabove is cited by way of example. Other flowcharts may be used in alternative embodiments. For example, in some embodiments, the order of some of the operations may be changed, and/or some of the operations may be performed concurrently.

The configurations of Computing systems 100, 110, 120, 400 and 600, including the configurations of TRC 410 and 606; the operation of flowchart 500 and 600, and the method of flowchart 200, illustrated in FIGS. 1 through 7, and described hereinabove, are example configurations and flowcharts that are depicted purely for the sake of conceptual clarity. Any other suitable configurations and flowcharts can be used in alternative embodiments. The computing systems and components thereof may be implemented using suitable hardware, such as in one or more Application-Specific Integrated Circuit (ASIC) or Field-Programmable Gate Arrays (FPGA), using software, using hardware, or using a combination of hardware and software elements.

In some embodiments, computing systems 100, 110, 120, 400, 600 including any component thereof, may be implemented using one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

In embodiments, other selection criteria can be used, besides or in addition to the location of the requested data and the comparison of the data to the DRTL parameter; for example, in an embodiment, the selection criterion is based on a fill-measure of the target table.

Although the embodiments described herein mainly address on-the-fly changing of memory tables, the methods and systems described herein can also be used in other applications.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for resizing a Last-In First-Out (LIFO) table comprising table elements stored in a memory, the method comprising:
- splitting the LIFO table into a first table and a second table, wherein the second table is to contain the resized LIFO table following the resizing;
- defining a "Do not Return to LIFO" (DTRL) threshold that distinguishes between (i) data values of table elements that are to be retained in the LIFO table following the resizing, and (ii) data values of table elements that are to be removed from the LIFO table following the resizing; and
- while the LIFO table is available for access by one or more users, performing an iterative process comprising, in each iteration:
  - scanning the first table until identifying a first table element whose data value is greater than or equal to the DTRL threshold;

scanning the second table until identifying a second table element whose data value is smaller than the DTRL threshold; and swapping the first table element and the second table element.

2. The method according to claim 1, further comprising managing each of (i) the LIFO table (ii) the first table, and (iii) the second table, as a respective Last-In First-Out (LIFO) data structure.

3. The method according to claim 1, further comprising responding to a request from the user to read a table element that corresponds to a given match key by:

if the second table contains a table element corresponding to the given match key, providing the user with the table element from the second table; and if no table element from the second table corresponds to the given match key, providing the user with a table element from the first table that corresponds to the match key.

4. The method according to claim 1, wherein scanning the first and second tables is performed using an iterator circuit.

5. The method according to claim 1, wherein the table elements comprise pointers to allocated memory segments.

6. An apparatus for resizing a Last-In First-Out (LIFO) table comprising table elements, the apparatus comprising:

a memory, to store the LIFO table; and a table remap circuit, to:

split the LIFO table into a first table and a second table, wherein the second table is to contain the resized LIFO table following the resizing;

define a "Do not Return to LIFO" (DTRL) threshold that distinguishes between (i) data values of table elements that are to be retained in the LIFO table following the resizing, and (ii) data values of table elements that are to be removed from the LIFO table following the resizing; and while the LIFO table is available for access by one or more users, perform an iterative process comprising, in each iteration:

scanning the first table until identifying a first table element whose data value is greater than or equal to the DTRL threshold;

scanning the second table until identifying a second table element whose data value is smaller than the DTRL threshold; and swapping the first table element and the second table element.

7. The apparatus according to claim 6, wherein the table remap circuit is to manage each of (i) the LIFO table (ii) the first table, and (iii) the second table, as a respective Last-In First-Out (LIFO) data structure.

8. The apparatus according to claim 6, wherein the table remap circuit is to respond to a request from the user to read a table element that corresponds to a given match key by:

if the second interim table contains a table element corresponding to the given match key, providing the user with the table element from the second table; and if no table element from the second interim table corresponds to the given match key, providing the user with a table element from the first table that corresponds to the match key.

9. The apparatus according to claim 6, wherein the table remap circuit comprises an iterator circuit for iteratively scanning tables in the memory, and wherein the table remap circuit is to scan the first and second tables using the iterator circuit.

10. The apparatus according to claim 6, wherein the table elements comprise pointers to allocated memory segments.

11. A computer software product for resizing a Last-In First-Out (LIFO) table comprising table elements stored in a memory, the product comprising a tangible non-transitory computer-readable medium in which program instructions are stored, which instructions, when read by one or more processors, cause the one or more processors to:

split the LIFO table into a first table and a second table, wherein the second table is to contain the resized LIFO table following the resizing;

define a "Do not Return to LIFO" (DTRL) threshold that distinguishes between (i) data values of table elements that are to be retained in the LIFO table following the resizing, and (ii) data values of table elements that are to be removed from the LIFO table following the resizing; and while the LIFO table is available for access by one or more users, perform an iterative process comprising, in each iteration:

scanning the first table until identifying a first table element whose data value is greater than or equal to the DTRL threshold;

scanning the second table until identifying a second table element whose data value is smaller than the DTRL threshold; and swapping the first table element and the second table element.

12. The apparatus according to claim 11, wherein the instructions cause the one or more processors to manage each of (i) the LIFO table (ii) the first table, and (iii) the second table, as a respective Last-In First-Out (LIFO) data structure.

13. The apparatus according to claim 11, wherein the instructions cause the one or more processors to respond to a request from the user to read a table element that corresponds to a given match key by:

if the second interim table contains a table element corresponding to the given match key, providing the user with the table element from the second table; and if no table element from the second interim table corresponds to the given match key, providing the user with a table element from the first table that corresponds to the match key.

14. The apparatus according to claim 11, wherein the instructions cause the one or more processors to scan the first and second tables using an iterator circuit.

15. The apparatus according to claim 11, wherein the table elements comprise pointers to allocated memory segments.

* * * * *